(12) United States Patent
Hosoda et al.

(10) Patent No.: US 11,485,113 B2
(45) Date of Patent: Nov. 1, 2022

(54) GLASS-RESIN COMPOSITE

(71) Applicant: Nippon Electric Glass Co., Ltd., Shiga (JP)

(72) Inventors: Yohei Hosoda, Shiga (JP); Shingo Nakane, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 421 days.

(21) Appl. No.: 16/605,611

(22) PCT Filed: Mar. 23, 2018

(86) PCT No.: PCT/JP2018/011578
§ 371 (c)(1),
(2) Date: Oct. 16, 2019

(87) PCT Pub. No.: WO2018/193788
PCT Pub. Date: Oct. 25, 2018

(65) Prior Publication Data
US 2020/0122433 A1    Apr. 23, 2020

(30) Foreign Application Priority Data

Apr. 17, 2017 (JP) .............................. JP2017-081148

(51) Int. Cl.
*B32B 7/027* (2019.01)
*B32B 17/10* (2006.01)
(Continued)

(52) U.S. Cl.
CPC .......... *B32B 7/027* (2019.01); *B32B 17/1011* (2013.01); *B32B 17/10064* (2013.01); *B32B 17/10119* (2013.01); *B32B 17/10761* (2013.01); *B32B 17/10788* (2013.01); *B32B 27/365* (2013.01); *C03C 3/087* (2013.01);
(Continued)

(58) Field of Classification Search
None
See application file for complete search history.

(56) References Cited

U.S. PATENT DOCUMENTS

2012/0128952 A1    5/2012    Miwa et al.
2013/0301118 A1   11/2013    Ogawa et al.
(Continued)

FOREIGN PATENT DOCUMENTS

JP    64-8821    1/1989
JP    8-300591   11/1996
(Continued)

OTHER PUBLICATIONS

Machine translation of JP 08-300591 A (Year: 1996).*
International Search Report dated Jun. 5, 2018 in International (PCT) Application No. PCT/JP2018/011578.

*Primary Examiner* — Ramsey Zacharia
(74) *Attorney, Agent, or Firm* — Wenderoth, Lind & Ponack, L.L.P.

(57) ABSTRACT

A glass-resin composite of the present invention includes at least a plurality of glass sheets and a resin sheet which are integrally combined with each other via an organic resin intermediate layer, wherein, out of inner glass sheets of the plurality of glass sheets, at least one glass sheet has a crystallinity of 30% or less and a Young's modulus of 75 GPa or more.

11 Claims, 1 Drawing Sheet

(51) Int. Cl.
   *B32B 27/36*   (2006.01)
   *C03C 3/087*   (2006.01)
   *B60J 1/00*    (2006.01)
   *B32B 27/06*   (2006.01)
   *C03C 3/085*   (2006.01)

(52) U.S. Cl.
   CPC ....... *B32B 2250/04* (2013.01); *B32B 2250/05* (2013.01); *B32B 2307/412* (2013.01); *B32B 2369/00* (2013.01); *B60J 1/00* (2013.01)

(56) References Cited

U.S. PATENT DOCUMENTS

| | | | |
|---|---|---|---|
| 2019/0030862 A1 | 1/2019 | Akiyama | |
| 2020/0055281 A1* | 2/2020 | Yoon | ................. B32B 17/10385 |

FOREIGN PATENT DOCUMENTS

| | | |
|---|---|---|
| JP | 2001-151539 | 6/2001 |
| JP | 2004-196184 | 7/2004 |
| JP | 2011-136895 | 7/2011 |
| JP | 2012-144217 | 8/2012 |
| WO | 2011/152380 | 12/2011 |
| WO | 2017/175682 | 10/2017 |

* cited by examiner

GLASS-RESIN COMPOSITE

TECHNICAL FIELD

The present invention relates to a glass-resin composite, and more particularly, to a glass-resin composite suitable for a windshield or a door glass of an automobile.

BACKGROUND ART

In general, a laminated glass, in which a plurality of soda lime glass sheets are integrally combined with each other via an organic resin intermediate layer, is used as a window glass of a vehicle or the like. For the purpose of weight saving, a glass-resin composite, in which a plurality of soda lime glass sheets and a resin sheet are integrally combined with each other via an organic resin intermediate layer, is sometimes used (see Patent Literatures 1 to 4).

The soda lime glass sheet to be used for a window glass of a vehicle or the like has a function of deforming its sheet shape encountering a tip portion of a scattered piece, such as a flying stone, while the vehicle or the like is moving, to thereby increase impact resistance against the scattered piece and thus attenuate collision energy with the scattered piece.

However, soda lime glass cannot be said to have a sufficient increasing effect on the impact resistance against the scattered piece. Under existing circumstances, the impact resistance against the scattered piece is increased by increasing the thickness of the soda lime glass sheet or increasing the number of sheets to be combined. However, this entails increases in thickness and weight of a window glass.

In view of the foregoing, in order to increase the impact resistance against the scattered piece, investigations have been made on use of a crystallized glass sheet instead of the soda lime glass sheet. For example, a crystallized glass sheet in which a $Li_2O$—$Al_2O_3$—$SiO_2$-based crystal, such as a β-quartz solid solution ($Li_2O.Al_2O_3.nSiO_2$ [where n≥2]), is deposited as a main crystal has been investigated.

CITATION LIST

Patent Literature

Patent Literature 1: JP 2012-144217 A
Patent Literature 2: JP 2004-196184 A
Patent Literature 3: JP 2001-151539 A
Patent Literature 4: JP 01-8821 U

SUMMARY OF INVENTION

Technical Problem

Incidentally, when the crystallinity of crystallized glass is increased, the hardness of the crystallized glass is increased, and thus the collision energy with the scattered piece can be attenuated. However, a deposited crystal inhibits softening and deforming, and hence bending work becomes difficult, with the result that such glass is not applicable to a windshield of an automobile or the like.

In addition, the collision energy with the scattered piece can also be attenuated by increasing the thickness of the crystallized glass. However, in this case, a window glass is increased in weight, and may also be impaired in transparency.

Thus, the present invention has been made in view of the above-mentioned circumstances, and a technological object of the present invention is to devise a window glass which is excellent in bending workability, and which can effectively attenuate collision energy with a scattered piece even when having a small thickness and a low crystallinity.

Solution to Problem

The inventors of the present invention have found that the above-mentioned technical object can be achieved by, in a glass-resin composite (glass-resin laminate) comprising a plurality of glass sheets and a resin sheet, increasing a Young's modulus of an inner glass sheet (on an indoor side). Thus, the finding is proposed as the present invention. Specifically, according to one embodiment of the present invention, there is provided a glass-resin composite for a window glass, comprising at least a plurality of glass sheets and a resin sheet, wherein, out of inner glass sheets of the plurality of glass sheets, at least one glass sheet has a crystallinity of 30% or less and a Young's modulus of 75 GPa or more. The "crystallinity" as used herein refers to a value determined as described below. XRD is measured by a powder method, and a halo area corresponding to a mass of an amorphous component and a peak area corresponding to a mass of a crystalline component are calculated, and then the crystallinity is determined by the expression: [peak area]×100/[peak area+halo area] (%). The "inner glass sheets" refer to glass sheets excluding an outermost glass sheet (on a side closest to the outdoors).

The glass-resin composite according to the one embodiment of the present invention is a composite comprising at least a plurality of glass sheets and a resin sheet. Each glass sheet has transparency and is formed of a material for increasing impact resistance. The resin sheet is formed of a material for alleviating an impact caused by collision with a scattered piece, and preventing scattering of a glass piece caused by the impact of the scattered piece. When both the constituents are incorporated, impact resistance performance is easily ensured.

In addition, in the glass-resin composite according to the one embodiment of the present invention, out of inner glass sheets of the plurality of glass sheets, at least one glass sheet has a crystallinity of 30% or less. With this, the bending workability of the glass sheet can be improved.

Further, the inventors of the present invention have analyzed the attenuation of collision energy with a scattered piece. As a result, the inventors have found that an impact wave generated when the scattered piece collides with a glass sheet travels in the glass-resin composite, and is then reflected on a back surface of the glass-resin composite opposite to a surface having been subjected to the collision. Then, when a traveling wave of the impact wave and a reflected wave resulting therefrom are superimposed on each other, cracks are generated in inner glass due to a tensile stress. The collision energy is attenuated as energy required for the generation of the cracks and compression energy generated when the scattered piece travels through the cracks. Therefore, when the traveling speeds of the traveling wave and the reflected wave are increased, a crack generation region is expanded, with the result that the collision energy can be effectively attenuated. In view of the foregoing, based on the above-mentioned finding, in the glass-resin composite according to the one embodiment of the present invention, out of the inner glass sheets, the Young's modulus of the at least one glass sheet is controlled to be 75 GPa or more. With this, the traveling speeds of the traveling wave and the reflected wave resulting from the impact wave generated by the collision with the scattered piece are increased in the inner glass sheet, a region in which the traveling wave and the reflected wave are superimposed on each other is expanded, and the collision energy with the scattered piece is easily absorbed as crack generation energy and compression energy in the crack generation region. As a result, the scattered piece hardly penetrates through the glass-resin composite. When the inner glass sheet has a low Young's modulus, the above-mentioned action is not exerted, and the collision energy with the scattered piece cannot be efficiently attenuated.

In addition, in the glass-resin composite according to the one embodiment of the present invention, it is preferred that out of the inner glass sheets, at least one glass sheet have a glass transition temperature of 850° C. or less. With this, the glass sheet arranged on an inside is easily subjected to bending work, and a curved shape is easily imparted to the glass-resin composite. The "glass transition temperature" as used herein refers to a value measured with a dilatometer.

In addition, in the glass-resin composite according to the one embodiment of the present invention, it is preferred that, out of the inner glass sheets, at least one glass sheet be amorphous, and comprise as a glass composition, in terms of mol %, 45% to 80% of $SiO_2$, 5% to 30% of $Al_2O_3$, 0% to 20% of $Li_2O+Na_2O+K_2O$, and 3% to 35% of $MgO+CaO+SrO+BaO$. The "amorphous" as used herein refers to a case of having a crystallinity of less than 1%. The content of "$Li_2O+Na_2O+K_2O$" refers to a total content of $Li_2O$, $Na_2O$, and $K_2O$. The content of "$MgO+CaO+SrO+BaO$" refers to a total content of MgO, CaO, SrO, and BaO.

In addition, in the glass-resin composite according to the one embodiment of the present invention, it is preferred that the resin sheet be arranged on an inside (indoor side) with respect to an innermost glass sheet of the plurality of glass sheets.

In addition, in the glass-resin composite according to the one embodiment of the present invention, it is preferred that the resin sheet comprise a polycarbonate sheet.

In addition, in the glass-resin composite according to the one embodiment of the present invention, it is preferred that the plurality of glass sheets and the resin sheet be integrally combined with each other via an organic resin intermediate layer.

In addition, it is preferred that the glass-resin composite according to the one embodiment of the present invention have a total thickness of 45 mm or less.

In addition, it is preferred that the glass-resin composite according to the one embodiment of the present invention have a curved shape which is three-dimensionally curved. FIG. 1 is a schematic view for illustrating an example of a glass-resin composite of the present invention. A glass-resin composite 10 comprises a composite of an outer glass sheet 11, an inner glass sheet 12, and a resin sheet 13. Moreover, the inner glass sheet 12 is amorphous, and the inner glass sheet 12 has a Young's modulus of 85 GPa. In addition, the outer glass sheet 11, the inner glass sheet 12, and the resin sheet 13 are integrally combined with each other via an organic resin intermediate layer (not shown). Moreover, the glass-resin composite 10 has a curved shape which is three-dimensionally curved. Specifically, the glass-resin composite 10 is curved in an arc shape in its entirety in a width direction and in a length direction with a convexity on an outer glass sheet 11 side.

DESCRIPTION OF EMBODIMENTS

A glass-resin composite of the present invention comprises a plurality of glass sheets, preferably 2 to 7, more preferably 2 or 3, particularly preferably 2 glass sheets. When the number of the glass sheets is one, the glass sheet is broken owing to an impact caused by collision with a scattered piece, and the travel of an impact wave is disrupted. Therefore, the generation of cracks resulting from superimposition of a traveling wave and a reflected wave does not occur, with the result that collision energy with the scattered piece is difficult to attenuate. When the number of the glass sheets is too large, transparency is reduced, and visibility is liable to be reduced. In addition, automobile fuel consumption or the like is liable to be increased owing to an increase in weight.

Figure 1:
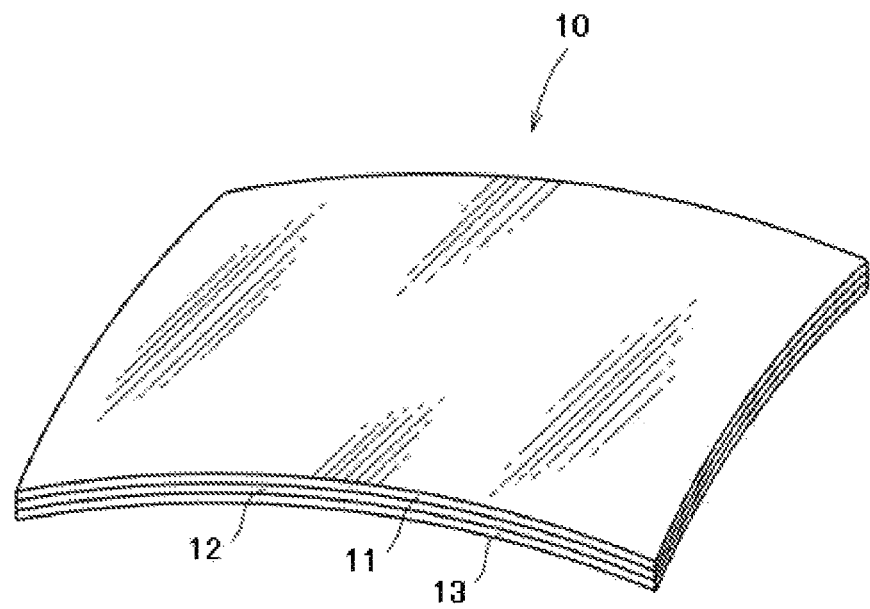
FIG. 1 is a schematic view for illustrating an example of a glass-resin composite of the present invention.
Figure 2:
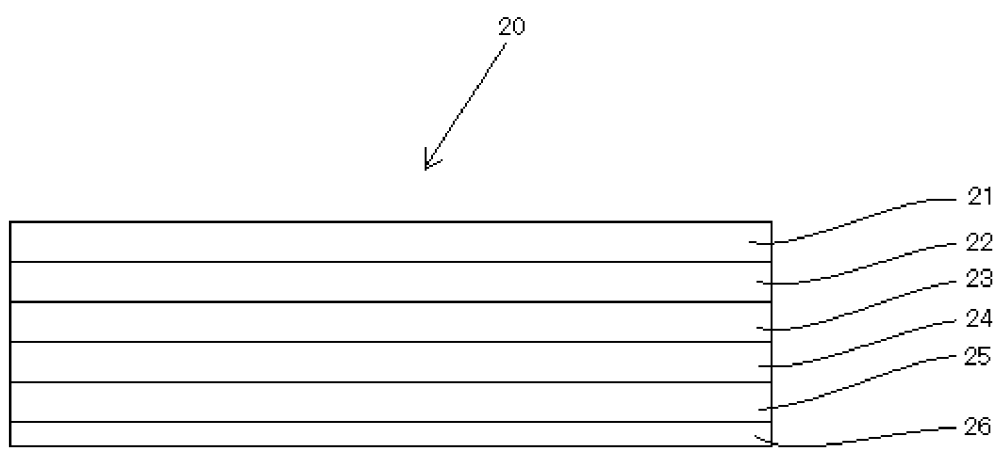
FIG. 2 is a schematic sectional view for illustrating an example of the glass-resin composite of the present invention.

FIG. 2 is a schematic sectional view for illustrating an example of the glass-resin composite of the present invention. A glass-resin composite 20 comprises a composite in which an outermost glass sheet 21, an inner glass sheet 22, an inner glass sheet 23, an inner glass sheet 24, an innermost glass sheet 25, and a resin sheet 26 are combined in the stated order when seen from an outside. Moreover, the outermost glass sheet 21, the glass sheet 22, the glass sheet 23, the glass sheet 24, and the innermost glass sheet 25 have Young's moduli of 68 GPa, 90 GPa, 84 GPa, 85 GPa, and 85 GPa, respectively. The Young's moduli of the inner glass sheets excluding the outermost glass sheet are each 80 GPa or more. An organic resin intermediate layer (not shown) is present between the glass sheets 21 to 25. The outermost glass sheet 21, the glass sheet 22, the glass sheet 23, the glass sheet 24, and the innermost glass sheet 25 are each amorphous.

In the glass-resin composite of the present invention, out of inner glass sheets, at least one glass sheet (preferably the innermost glass sheet) has a Young's modulus of 75 GPa or more, preferably 80 GPa or more or 85 GPa or more, particularly preferably from 90 GPa or more. When the Young's modulus of the glass sheet arranged on an inside is reduced, it becomes difficult to attenuate the collision energy with the scattered piece.

In the glass-resin composite of the present invention, the glass sheet (preferably each of glass sheets excluding the outermost glass sheet, particularly preferably the innermost glass sheet) has a glass transition temperature of preferably 850° C. or less, more preferably 820° C. or less, particularly preferably from 500° C. to 800° C. When the glass transition temperature is too high, it becomes difficult to subject the glass sheet to bending work.

The glass sheet (preferably each of glass sheets excluding the innermost glass sheet, particularly preferably the outermost glass sheet) has a crystallinity of preferably 30% or less, more preferably 10% or less, particularly preferably less than 1%, that is, the glass sheet is formed of amorphous glass. When the crystallinity is too high, it becomes difficult to subject the glass sheet to bending work.

The glass sheet is preferably free of a compressive stress layer formed through ion exchange. With this, ion exchange treatment is not required, and the production cost of the glass sheet can be reduced.

The glass sheet (preferably each of glass sheets excluding the outermost glass sheet, particularly preferably the innermost glass sheet) has a thickness of preferably 15 mm or less, 12 mm or less, or 10 mm or less, particularly preferably 8 mm or less, and preferably 3 mm or more, 4 mm or more, 5 mm or more, or 6 mm or more, particularly preferably 7 mm or more. When the thickness of each glass sheet is too small, it becomes difficult to ensure impact resistance performance. Meanwhile, when the thickness of each glass sheet is too large, the thinning of the glass-resin composite becomes difficult, and the visibility is liable to be reduced. In addition, the weight of the glass-resin composite is increased, and automobile fuel consumption or the like is increased.

The long-side dimensions of the innermost glass sheet are preferably smaller than the long-side dimensions of the outermost glass sheet. Moreover, a difference in long-side dimensions between those glass sheets is preferably adjusted depending on a difference in thermal expansion coefficient between the glass sheets. With this, when the glass sheets are integrally combined with each other after subjected to bending work so as to be formed into a shape having a convexity on an outside, a difference in dimensions between the glass sheets is reduced, and thus end surfaces thereof are easily aligned with each other. As a result, the strength of the glass-resin composite on an end surface is increased.

The inner glass sheet is preferably formed of aluminosilicate glass. The aluminosilicate glass is suitable as the glass sheet arranged on an inside because of having a high Young's modulus. In addition, the aluminosilicate glass is easily formed into a sheet shape because of having satisfactory devitrification resistance.

It is preferred that the inner glass sheet comprise as a glass composition, in terms of mol %, 45% to 80% of $SiO_2$, 5% to 30% of $Al_2O_3$, 0% to 20% of $Li_2O+Na_2O+K_2O$, and 3% to 35% of $MgO+CaO+SrO+BaO$. The reasons why the content range of each component is limited as described above are described below. In the description of the content range of each component, the expression "%" means "mol %".

$SiO_2$ is a component which forms a glass network. The content of $SiO_2$ is preferably from 45% to 80% or from 50% to 75%, particularly preferably from 57% to 72%. When the content of $SiO_2$ is too small, vitrification does not occur easily, and weather resistance is liable to be reduced. Meanwhile, when the content of $SiO_2$ is too large, meltability and formability are liable to be reduced. In addition, a thermal expansion coefficient becomes too low, with the result that it becomes difficult to match the thermal expansion coefficient with those of the resin sheet and the organic resin intermediate layer.

$Al_2O_3$ is a component which increases the weather resistance and a Young's modulus. The content of $Al_2O_3$ is preferably from 5% to 30% or from 9% to 25%, particularly preferably from 15% to 23%. When the content of $Al_2O_3$ is too small, the weather resistance and the Young's modulus are liable to be reduced. Meanwhile, when the content of $Al_2O_3$ is too large, the meltability, the formability, and the devitrification resistance are liable to be reduced.

$Li_2O$, $Na_2O$, and $K_2O$ are each a component which reduces a viscosity at high temperature to increase the meltability, the formability, and thermal processability. In particular, $Li_2O$ is a component which increases the Young's modulus. The total content of $Li_2O$, $Na_2O$, and $K_2O$ is preferably from 0% to 20% or from 5% to 20%, particularly preferably from 10% to 20%. The content of each of $Li_2O$, $Na_2O$, and $K_2O$ is preferably from 0% to 20% or from 3% to 15%, particularly preferably from 8% to 16%. When the content of $Li_2O$, $Na_2O$, and $K_2O$ is too large, the devitrification resistance and the weather resistance are liable to be reduced. Meanwhile, when the content of $Na_2O$ and $K_2O$ is too large, the Young's modulus is liable to be reduced.

MgO, CaO, SrO, and BaO are each a component which reduces the viscosity at high temperature to increase the meltability, the formability, and the thermal processability. In particular, MgO is a component which significantly increases the Young's modulus. The total content of MgO, CaO, SrO, and BaO is preferably from 3% to 35% or from 10% to 30%, particularly preferably from 12% to 25%. The content of MgO is preferably from 0% to 35% or from 5% to 25%, particularly preferably from 10% to 20%. The content of each of CaO, SrO, and BaO is preferably from 0% to 20% or from 0% to 10%, particularly preferably from 0% to 5%. When the content of MgO, CaO, SrO, and BaO is too large, the devitrification resistance is liable to be reduced. Meanwhile, when the content of CaO, SrO, and BaO is too large, the Young's modulus is liable to be reduced.

A molar ratio MgO/(MgO+CaO+SrO+BaO) is preferably 0.5 or more, 0.7 or more, or 0.8 or more, particularly preferably 0.9 or more from the viewpoint of effectively increasing the Young's modulus. The molar ratio "MgO/(MgO+CaO+SrO+BaO)" refers to a value obtained by dividing the content of MgO by the total content of MgO, CaO, SrO, and BaO.

For example, the following components other than the above-mentioned components may be added.

$B_2O_3$ is a component which forms the glass network, but is also a component which reduces the Young's modulus and the weather resistance. Therefore, the content of $B_2O_3$ is preferably from 0% to 20% or from 0% to 10%, particularly preferably from 0% to 5%.

$TiO_2$ is a component which increases the weather resistance, but is also a component which colors glass. Therefore, the content of $TiO_2$ is preferably from 0% to 0.5%, particularly preferably from 0% to less than 0.1%.

$ZrO_2$ is a component which increases the Young's modulus and the weather resistance, but is also a component which reduces the devitrification resistance. Therefore, the content of $ZrO_2$ is preferably from 0% to 0.5%, particularly preferably from 0% to less than 0.1%.

As a fining agent, one kind or two or more kinds selected from the group consisting of $SnO_2$, Cl, $SO_3$, and $CeO_2$ (preferably the group consisting of $SnO_2$ and $SO_3$) may be added at from 0.05% to 0.5%.

$Fe_2O_3$ is a component which is inevitably mixed in glass raw materials as an impurity, and is also a coloring component. Therefore, the content of $Fe_2O_3$ is preferably 0.5% or less, particularly preferably from 0.01% to 0.07%.

$V_2O_5$, $Cr_2O_3$, $CoO_3$, and NiO are each a coloring component. Therefore, the content of each of $V_2O_5$, $Cr_2O_3$, $CoO_3$, and NiO is preferably 0.1% or less, particularly preferably less than 0.01%.

A rare earth oxide, such as $Nd_2O_3$ or $La_2O_3$, is a component which increases the Young's modulus. However, the cost of the raw material itself is high, and when the rare earth oxide is added in a large amount, the devitrification resistance is liable to be reduced. Therefore, the total content of the rare earth oxides is preferably 3% or less, 1% or less, or 0.5% or less, particularly preferably 0.1% or less.

It is preferred that the glass-resin composite be substantially free of $As_2O_3$, $Sb_2O_3$, PbO, $Bi_2O_3$, and F as a glass composition from the standpoint of environmental considerations. The "substantially free of" as used herein has a general meaning that a case in which the explicit component is not positively added as a glass component, but is mixed as an impurity is permitted, and specifically refers to a case in which the content of the explicit component is less than 0.05%.

When the number of the inner glass sheets is two or more, the glass sheets do not necessarily have the same glass composition, but preferably have glass compositions falling within the above-mentioned range. In addition, the glass composition of the outermost glass sheet is not particularly limited, but the outermost glass sheet may have the above-mentioned glass composition.

The glass-resin composite of the present invention comprises the resin sheet in order to alleviate an impact force caused by the collision with the scattered piece. The number of the resin sheets is not particularly limited, but is preferably one from the viewpoint of increasing the visibility. When the number of the resin sheets is too large, the transparency is reduced, and the visibility of the glass-resin composite is liable to be reduced.

It is preferred that the resin sheet be arranged on an inside with respect to the innermost glass sheet. With this, an impact caused by the collision with the scattered piece is easily alleviated. In addition, in case any of the glass sheets is broken by the collision with the scattered piece, a situation in which a glass piece is scattered toward an inside can be prevented.

As the resin sheet, various resin sheets, such as an acrylic sheet and a polycarbonate sheet, may be used. In particular, of those, a polycarbonate sheet is particularly preferred from the viewpoints of transparency, an impact alleviating property, and weight saving.

The thickness of the resin sheet is preferably 10 mm or less, 8 mm or less, 7 mm or less, or 6 mm or less, particularly preferably 5 mm or less, and is preferably 0.5 mm or more, 0.7 mm or more, 1 mm or more, or 2 mm or more, particularly preferably 3 mm or more. When the thickness of the resin sheet is too small, it becomes difficult to alleviate the impact caused by the collision with the scattered piece. Meanwhile, when the thickness of the resin sheet is too large, the thinning of the glass-resin composite becomes difficult, and the visibility is liable to be reduced.

The total thickness of the glass-resin composite is preferably 45 mm or less, 35 mm or less, 30 mm or less, or 25 mm or less, particularly preferably 22 mm or less, and is preferably 7 mm or more, 11 mm or more, or 12 mm or more, particularly preferably 15 mm or more. When the total thickness of the glass-resin composite is too small, impact resistance performance is liable to be reduced. Meanwhile, when the thickness of the glass-resin composite is too large, the weight of the glass-resin composite is increased, and the visibility is liable to be reduced.

In the glass-resin composite of the present invention, an organic resin (organic resin intermediate layer) is preferably used in order to integrally combine the plurality of glass sheets and the resin sheet with each other. The thickness of the organic resin intermediate layer is preferably from 0.1 mm to 2 mm, from 0.3 mm to 1.5 mm, or from 0.5 mm to 1.2 mm, particularly preferably from 0.6 mm to 0.9 mm. When the thickness of the organic resin intermediate layer is too small, peeling energy of the organic resin intermediate layer is reduced, and it becomes difficult to attenuate impact energy of the scattered piece. Meanwhile, when the thickness of the organic resin intermediate layer is too large, the visibility of the glass-resin composite is liable to be reduced.

It is preferred that the thermal expansion coefficient of the organic resin intermediate layer be equal to or higher than the thermal expansion coefficient of the glass sheet, and be also equal to or lower than the thermal expansion coefficient of the resin sheet. With this, when the glass-resin composite is heated by direct sunlight, the glass sheet and the resin sheet are less liable to be separated and deformed. The "thermal expansion coefficient" refers to an average linear thermal expansion coefficient within a temperature range of from 0° C. to 300° C.

As the organic resin intermediate layer, various organic resins may be used. For example, polyethylene (PE), an ethylene-vinyl acetate copolymer (EVA), polypropylene (PP), polystyrene (PS), a methacrylic resin (PMA), polyvinyl chloride (PVC), polyethylene terephthalate (PET), polybutylene terephthalate (PBT), cellulose acetate (CA), a diallyl phthalate resin (DAP), a urea resin (UP), a melamine resin (MF), an unsaturated polyester (UP), polyvinyl butyral (PVB), polyvinyl formal (PVF), polyvinyl alcohol (PVAL), a vinyl acetate resin (PVAc), an ionomer (IC)), polymethylpentene (TPX), vinylidene chloride (PVDC), polysulfone (PSF), polyvinylidene fluoride (PVDF), a methacrylic-styrene copolymer resin (MS), polyarylate (PAR), polyarylsulfone (PASF), polybutadiene (BR), polyethersulfone (PESF), or polyether ether ketone (PEEK) may be used. Of those, from the viewpoints of transparency and fixability, EVA and PVB are suitable, and PVB is particularly preferred because of being capable of imparting a sound insulation property.

A colorant, or an absorber for absorbing light at a specific wavelength, such as infrared light or ultraviolet light, may be added to the organic resin intermediate layer.

A combination of a plurality of kinds of the above-mentioned organic resins may be used for the organic resin intermediate layer. For example, when a double-layered organic resin intermediate layer is used for integrally combining the glass sheet and the resin sheet, the glass sheet and the resin sheet are fixed to each other via different organic resins, with the result that warpage of the glass-resin composite is easily reduced.

The glass-resin composite of the present invention may be produced as described below.

First, glass raw materials having been blended so as to give a predetermined glass composition are loaded into a continuous melting furnace and melted by heating at from 1,500° C. to 1,700° C. The contents are fined and stirred, and then fed to a forming apparatus to be formed into a sheet shape, followed by annealing. Thus, a glass sheet can be produced.

An overflow down-draw method is preferably adopted as a method of forming the glass sheet into a flat sheet shape. The overflow down-draw method is a method by which a high-quality glass sheet having a surface in an unpolished state can be produced in a large amount, and by which even a large-size glass sheet can be easily produced. When the glass sheet has an unpolished surface, the production cost of the glass sheet can be reduced.

It is also preferred to form the glass sheet by a float method, other than the overflow down-draw method. The float method is a method by which a large-size glass sheet can be produced inexpensively.

The glass sheet is preferably subjected to chamfering processing as required. In this case, C chamfering processing with a #800 metal bond abrasive or the like is preferably performed. With this, strength on an end surface can be increased. It is also preferred to subject an end surface of the glass sheet to etching to reduce crack sources present on the end surface, as required.

Next, the resultant glass sheet is subjected to bending work as required. Various methods may be adopted as a method for the bending work. In particular, a method involving press forming a glass sheet with a mold is preferred. The method preferably involves causing the glass sheet to pass through a heat treatment furnace under a state of being sandwiched in a mold having a predetermined shape. With this, dimensional accuracy of a curved shape can be increased. In addition, a method involving arranging a glass sheet on a mold having a predetermined shape, followed by subjecting part or the entirety of the glass sheet to heat treatment, to thereby soften and deform the glass sheet under its own weight along the shape of the mold is also preferred. With this, the efficiency of the bending work can be increased.

Further, a plurality of the glass sheets and the resin sheet are integrally combined with each other via the organic resin intermediate layer. Thus, the glass-resin composite is provided. As a method for the integral combination, there are given, for example: a method involving pouring an organic resin between the glass sheets or between the glass sheet and the resin sheet, followed by curing the organic resin; and a method involving arranging an organic resin sheet between the glass sheets or between the glass sheet and the resin sheet, followed by subjecting the organic resin sheet to pressure and heat treatment (heat pressure bonding). The former method enables suppression of deformation of the resin sheet caused by mismatch in expansion between the glass sheet and the resin sheet. The latter method facilitates the integral combination.

In addition, after the integral combination, a functional film, such as a hard coat film, an infrared reflective film, or a heat reflective film, may be formed on an outer surface of the outermost glass sheet. In addition, before the integral combination, a functional film, such as a hard coat film, an infrared reflective film, or a heat reflective film, may be formed on an inner surface of the outermost glass sheet.

EXAMPLES

The present invention is hereinafter described in detail by way of Examples. However, Examples below are merely examples, and the present invention is by no means limited to Examples below.

A glass sheet was produced as described below. Glass raw materials were blended so as to provide a glass sheet shown in Table 1. Next, the glass batch having been blended was loaded into a continuous melting furnace and melted at 1,600° C. for 20 hours. After that, the contents were fined and stirred to provide homogeneous molten glass. The molten glass was formed into a sheet shape having a thickness of 8.0 mm. The resultant glass sheet was evaluated for a Young's modulus, a glass transition temperature, and a crystallinity. The glass sheets according to Sample Nos. 1 to 10 each had a mixed impurity amount of 0.05 mol % for $Fe_2O_3$, and a mixed impurity amount of less than 0.01 mol % for each of $V_2O_3$, $Cr_2O_3$, $CoO_3$, and NiO.

TABLE 1

| | | No. 1 | No. 2 | No. 3 | No. 4 | No. 5 | No. 6 | No. 7 | No. 8 | No. 9 | No. 10 | Soda |
|---|---|---|---|---|---|---|---|---|---|---|---|---|
| Glass composition (mol %) | $SiO_2$ | 69.8 | 59.7 | 59.7 | 52.4 | 59.9 | 59.9 | 72.8 | 69.9 | 64.9 | 74.0 | 72.0 |
| | $Al_2O_3$ | 10.0 | 20.0 | 20.0 | 17.5 | 15.0 | 10.0 | 13.0 | 5.0 | 5.0 | 7.0 | 1.0 |
| | $B_2O_3$ | 0.0 | 0.0 | 0.0 | 0.0 | 5.0 | 10.0 | 0.0 | 0.0 | 20.0 | 0.0 | 0.0 |
| | $Li_2O$ | 0.0 | 0.0 | 0.0 | 0.0 | 0.0 | 0.0 | 9.0 | 0.0 | 0.0 | 0.0 | 0.0 |
| | $Na_2O$ | 5.1 | 5.0 | 0.0 | 0.0 | 5.0 | 5.0 | 1.5 | 25.0 | 2.0 | 4.0 | 14.0 |
| | $K_2O$ | 0.0 | 0.0 | 0.0 | 0.0 | 0.0 | 0.0 | 0.0 | 0.0 | 0.0 | 0.0 | 0.0 |
| | MgO | 15.0 | 3.0 | 20.0 | 30.0 | 15.0 | 15.0 | 2.0 | 0.0 | 8.0 | 0.0 | 1.0 |
| | CaO | 0.0 | 0.0 | 0.0 | 0.0 | 0.0 | 0.0 | 0.0 | 0.0 | 0.0 | 0.0 | 11.0 |
| | SrO | 0.0 | 0.0 | 0.0 | 0.0 | 0.0 | 0.0 | 0.0 | 0.0 | 0.0 | 0.0 | 0.0 |
| | BaO | 0.0 | 12.0 | 0.0 | 0.0 | 0.0 | 0.0 | 1.5 | 0.0 | 0.0 | 15.0 | 0.0 |
| | $SnO_2$ | 0.1 | 0.3 | 0.3 | 0.1 | 0.1 | 0.1 | 0.2 | 0.1 | 0.1 | 0.0 | 0.0 |
| $Li_2O + Na_2O + K_2O$ | | 5.1 | 5.0 | 0.0 | 0.0 | 5.0 | 5.0 | 10.5 | 25.0 | 2.0 | 4.0 | 14.0 |
| MgO + CaO + SrO + BaO | | 15.0 | 15.0 | 20.0 | 30.0 | 15.0 | 15.0 | 3.5 | 0.0 | 8.0 | 15.0 | 12.0 |
| Young's modulus (GPa) | | 82 | 80 | 100 | 105 | 85 | 77 | 80 | 65 | 68 | 72 | 68 |
| Glass transition temperature (° C.) | | 740 | 810 | 820 | 795 | 702 | 650 | 700 | 520 | 680 | 650 | 520 |
| Crystallinity (%) | | 0 | 0 | 0 | 0 | 0 | 0 | 0 | 0 | 0 | 0 | 0 |

The Young's modulus is a value measured by a well-known resonance method.

The glass transition temperature is a value measured with a dilatometer.

The crystallinity refers to a value determined as described below. XRD is measured by a powder method, and a halo area corresponding to a mass of an amorphous component and a peak area corresponding to a mass of a crystalline component are calculated, and then the crystallinity is determined by the expression: [peak area]×100/[peak area+halo area] (%).

In addition, the glass sheet of each sample was passed through a heat treatment furnace under a state of being sandwiched in a mold having a predetermined shape. Thus, the glass sheet was subjected to bending work to be formed into a curved shape in which the glass sheet was curved in an arc shape in its entirety in a width direction and curved in an arc shape in its entirety in a length direction. After that, an end surface of the glass sheet after the bending work was subjected to C chamfering processing with a #800 metal bond abrasive and to polishing processing.

Next, a polycarbonate sheet (thickness: 4.0 mm) and a soda glass sheet (thickness: 8.0 mm) each having the same curved shape as the glass sheet were prepared. The glass composition, glass transition temperature, Young's modulus, and crystallinity of the soda glass sheet are as shown in Table 1.

Finally, through use of polyvinyl butyral (PVB) having a thickness of 0.8 mm, the soda glass sheet (outermost glass sheet), the glass sheet (innermost glass sheet) shown in Table 1, and the polycarbonate sheet were integrally combined with each other through an autoclave treatment so that these components were arranged in the stated order. Thus, each of glass-resin composites according to Sample Nos. 1 to 10 was obtained.

In each of Sample Nos. 1 to 7, the Young's modulus of the innermost glass sheet is 75 GPa or more, and hence it is considered that impact energy of a scattered piece can be effectively attenuated. Meanwhile, in each of Sample Nos. 8 to 10, the Young's modulus of the innermost glass sheet is less than 75 GPa, and hence it is considered that impact energy of a scattered piece is difficult to attenuate. Each of Sample Nos. 1 to 10 has a light weight because the thickness of the glass-resin composite is 21.6 mm, and the polycarbonate sheet having a thickness of 4.0 mm is incorporated therein.

INDUSTRIAL APPLICABILITY

The glass-resin composite of the present invention is suitable as a window glass of an automobile, a railway vehicle, an aircraft, or the like. Other than those applications, the glass-resin composite of the present invention is also suitable as a window glass of a building, such as a high-rise building.

REFERENCE SIGNS LIST 10, 20 glass-resin composite
11, 21 glass sheet (outer glass sheet)
12, 25 glass sheet (inner glass sheet)
13, 26 resin sheet
22 to 24 glass sheet (inner glass sheet)

The invention claimed is:

1. A glass-resin composite for a window glass, the glass-resin composite comprising at least a plurality of glass sheets and a resin sheet,
wherein, out of inner glass sheets of the plurality of glass sheets, at least one of the inner glass sheets comprises, as a glass composition, a molar ratio MgO/(MgO+CaO+SrO+BaO) of 0.5 or more, has a crystallinity of 30% or less and a Young's modulus of 75 GPa or more.

2. The glass-resin composite according to claim 1, wherein, out of the inner glass sheets, at least one of the inner glass sheets has a glass transition temperature of 850° C. or less.

3. The glass-resin composite according to claim 1, wherein, out of the inner glass sheets, at least one of the inner glass sheets is amorphous, and comprises as a glass composition, in terms of mol %, 45% to 80% of $SiO_2$, 5% to 30% of $Al_2O_3$, 0% to 20% of $Li_2O+Na_2O+K_2O$, and 3% to 35% of MgO+CaO+SrO+BaO.

4. The glass-resin composite according to claim 1, wherein the resin sheet is arranged on an inside with respect to an innermost glass sheet of the plurality of glass sheets.

5. The glass-resin composite according to claim 1, wherein the resin sheet comprises a polycarbonate sheet.

6. The glass-resin composite according to claim 1, wherein the plurality of glass sheets and the resin sheet are integrally combined with each other via an organic resin intermediate layer.

7. The glass-resin composite according to claim 1, wherein the glass-resin composite has a total thickness of 45 mm or less.

8. The glass-resin composite according to claim 1, wherein the glass-resin composite has a curved shape which is three-dimensionally curved.

9. The glass-resin composite according to claim 2, wherein, out of the inner glass sheets, at least one of the inner glass sheets is amorphous, and comprises as a glass composition, in terms of mol %, 45% to 80% of $SiO_2$, 5% to 30% of $Al_2O_3$, 0% to 20% of $Li_2O+Na_2O+K_2O$, and 3% to 35% of MgO+CaO+SrO+BaO.

10. The glass-resin composite according to claim 1, wherein the at least one of the inner glass sheets has a content of MgO of 10 mol % to 35 mol %.

11. The glass-resin composite according to claim 1, wherein the glass-resin composite has a total thickness of 7 mm or more.

* * * * *